Patented June 12, 1945

2,377,985

UNITED STATES PATENT OFFICE 2,377,985

POLYAMIDE SOLUTIONS

William Way Watkins, Buffalo, N. Y., assignor to E. I. du Pont de Nemours & Company, Wilmington, Del., a corporation of Delaware No Drawing. Application June 10, 1943, Serial No. 490,333

6 Claims. (Cl. 260—29)

This invention relates to compositions of matter, and more particularly to new and useful compositions of matter comprising solutions of synthetic linear polyamides.

The synthetic linear polyamides with which this invention is concerned are the type described in United States Patents Nos. 2,071,250, 2,071,253 and 2,130,948. It is, therefore, to be understood that the expression "synthetic linear polyamide" as used herein designates a polyamide such as is disclosed in the above-identified patents. The polyamides are of two types, those derived from polymerizable monoaminomonocarboxylic acids or their amide-forming derivatives, and those derived from the reaction of suitable diamines with suitable dicarboxylic acids or amide-forming derivatives of dibasic carboxylic acids. A characteristic property of these polyamides is that they can be formed into filaments which can be cold-drawn into fibers showing molecular orientation along the fiber axis. These polyamides are most useful for the preparation of fibers, bristles, ribbons, sheets, foils, and coatings on wood, metal, paper, fabric, regenerated cellulose and the like.

Articles prepared from the polyamides are resistant to moisture, resistant to most solvents, and possess an unusually high degree of toughness and strength. However, the commercial production of articles formed of or containing polyamides has been limited mostly to the extrusion of the polymer from the molten state. There are obvious advantages in the use of solutions over molten compositions to achieve the fluid state necessary in lacquers, coating compositions and dopes suitable for use in forming various articles, such as films, sheets, ribbons, bristles and films. For example, in coating fabrics, paper or other materials which are charred or tendered by high temperatures, the use of a solution which can be applied and subsequently evaporated to dryness at a relatively low temperature does not cause deterioration of the material being coated. It is often desirable to prepare a fluid composition for use over a period of time and, in that event, it is convenient if the composition can be kept in the liquid state for storage at ordinary temperatures. The application of such solutions as lacquers or adhesives is much more easily carried out by methods well known in the art than is the application by a molten composition. Further, the incorporation of a plasticizer or other modifying agent into polyamides is frequently more advantageously done by addition of the plasticizer or other modifying agent to a solution of the polyamide rather than to a molten polyamide. Further, there is a tendency with certain types of plasticizers and modifying agents to be less compatible at high temperatures required for blending in a melt whereas they can be readily incorporated in a polyamide solution at low temperatures. A still further advantage in the use of solutions lies in the ease with which they can be cast into films or coatings of uniform thickness, which is mechanically more difficult to accomplish with a molten composition due to its relatively high viscosity.

Although there is in the prior art certain solvents for the polyamides (see U. S. Patents Nos. 2,130,948, 2,293,760, and 2,293,761), such solvents are not practical with the more insoluble simple polyamides, such as highly polymerized hexamethylene adipamide.

The object of this invention is new and useful compositions of matter comprising synthetic linear polyamide solutions which are useful in making threads, filaments, bristles, ribbons, films, coatings, laminations and the like.

These and other objects of the invention which will become apparent from the following description are accomplished by dissolving the polyamide in a nitro alcohol.

The invention is described more specifically in the following examples in which the parts are by weight:

*Example I*

To 15 parts of polyhexamethylene adipamide having an intrinsic viscosity of 0.6, as defined in United States Patent No. 2,130,948, are added 85 parts of 2-nitro 1-ethanol and the mixture heated on a bath with stirring to 120° C. In a few minutes, the polymer dissolves and the solution becomes clear. The solution so prepared is used to coat fabric material. The coated fabric is flexible, resistant to wear, and highly impervious to moisture.

*Example II*

To 1 part of polyhexamethylene adipamide having an intrinsic viscosity of 0.45 are added 9 parts of 2-nitro 1-butanol and the mixture heated to 110° C. At this temperature, solution of the polymer is complete and the solution becomes clear. This solution is applied as a thin coating to a wood surface. The coating is smooth, hard, and highly resistant to moisture.

*Example III*

To 4 parts of polyhexamethylene sebacamide having an intrinsic viscosity of 1.0 are added 30 parts of 2-nitro 1-propanol and the mixture is heated on a bath to 125° C. Solution of the polymer is complete at this temperature. This solution is applied to copper wire by dipping the wire in the solution and thereafter baking. The coating is smooth, glossy, and does not peel or crack when the wire is bent.

*Example IV*

To 1 part of an interpolymer, prepared from hexamethylene adipamide and hexamethylene sebacamide in the weight ratio of 30:70 and having an intrinsic viscosity of 1.0, are added 19 parts of 2-nitro 1-butanol and the mixture heated on a bath to 75° C. when solution of the polymer results. This solution is used to coat cotton fabric. The coated fabric remains flexible, has good resistance to wear, and is highly impervious to moisture.

*Example V*

5 parts of an interpolymer of hexamethylene adipamide and hexamethylene sebacamide in the weight ratio of 60:40 and having an intrinsic viscosity of 0.8 are mixed with 20 parts of a solvent consisting of 7½ parts of 2-nitro 1-butanol, 7½ parts of ethylene chlorhydrin and 5 parts of benzyl alcohol. The mixture is heated on a bath at a temperature of 130° C. The polymer dissolves easily. The solution is used to form a coating on wire screen by dipping the wire in the solution and drying. The coating shows good adherence to the metal and good resistance to abrasion.

*Example VI*

5 parts of an interpolymer of hexamethylene adipamide and decamethylene sebacamide in the weight ratio of 50:50 and having an intrinsic viscosity of 1.2 are mixed with 20 parts of 2-nitro 2-methyl 1-propanol and the mixture heated on a bath to a temperature of 110° C. Solution of the polymer is quite rapid at this temperature. This solution is cast on a glass plate at 180° C. and, after most of the solvent vapors have disappeared, the resulting film is dried in an oven at 110° C. After drying, the film is washed off the plate. When completely dried, the film is transparent, clear, shows no brittleness, and can be stretched appreciably.

In the foregoing examples, the nitro alcohols which have been described as solvents of the polyamides are typical of the class of mono nitro derivatives of the monohydric aliphatic alcohols of 2 to 8 carbon atoms, wherein the nitro group occupies the alpha position, and the invention includes such class. Additional examples include 2-nitro 1-hexanol, 3-nitro 1-butanol, and 2-nitro 1-octanol.

In addition to the class of simple nitro alcohols herein specified, the alkyl derivatives thereof exert strong solvent action on the polyamides and are included in this invention. In general, the alkyl derivatives are those wherein substitution of an alkyl group of 2 to 5 carbon atoms for a hydrogen atom is made on the same carbon atom carrying a nitro group. 2-ethyl 2-nitro 1-propanol and 2-butyl 2-nitro 1-propanol are illustrative examples of this type of solvent of the polyamide.

The solvents herein referred to may be used singly or conjointly with each other or conjointly with other solvents or diluents, as desired.

The proportions of the polymer and the solvent are not restricted to the specific proportions set forth in the examples, since solutions having a concentration of polymer up to 50%, or indeed more, can be obtained.

While the solvent action of the nitro alcohols is especially suitable for the highly polymerized polyamides, it is not specifically limited thereto, since the invention is applicable also to polyamides of both high and low degrees of polymerization.

Similarly, while the invention is most important with respect to the simple polyamides, it is equally useful for the interpolyamides. Examples of such interpolyamides would include those derived from the combination of the following diamines with the following dibasic acids:

Diamines—
 Tetramethylenediamine
 Pentamethylenediamine
 Hexamethylenediamine
 Octamethylenediamine
 Decamethylenediamine Dibasic acids—
 Adipic acid
 Sebacic acid
 Suberic acid
 Azelaic acid In general, the polyamide should have an intrinsic viscosity above 0.4, and preferably above 0.6. The expression "intrinsic viscosity" is to be understood in accordance with the definition thereof contained in United States Patent No. 2,130,948.

While these solutions are generally prepared by heating on a bath, other suitable means may be used. Stirring of the mixture during the heating process is advantageous but is not always necessary. Refluxing during solution is preferable but is not a necessary embodiment of the invention. Likewise, the use of heat to accomplish solution of the materials is advantageous, although the same results may be achieved in many instances in longer periods of time by allowing the mixture to stand without heating or stirring.

The properties of objects formed from the compositions herein described may be modified by appropriate modification of the compositions. Thus, the compositions of this invention may have incorporated therein various modifying agents, such as plasticizers, dyes, pigments, diluents, resins, cellulose derivatives, waxes, water repellents, luster modifying agents, anti-oxidants, oils, antiseptics, flame repellents, and the like.

While specific reference has been made to the use of the solution for coating of fabric and the formation of a film, the invention is not restricted thereto, since the solution is useful for forming a variety of objects irrespective of the shape of the object. Typical objects which can be formed from the solutions are fibers, filaments, bristles, surgical sutures, fishing leaders, fishline, dental floss, films, ribbons, sheets, safety glass interlayers, golf ball covers, and plasticized or otherwise modified solid compositions useful for making molded articles. The solutions are also useful for application as lacquers on wood, metal, glass and other surfaces, for coating wire, fabrics, paper, regenerated cellulose and the like, and for impregnating fabric, paper and other porous materials.

Particular advantages of the use of nitro alcohol solutions of polyamides reside in the fact that they may be used at much lower temperatures than have been possible in the prior art method of melt-extrusion. Moreover, the formation of some shaped objects is much more easily accomplished from solutions than is possible from molten polymer. Shaped articles prepared from nitro alcohol solutions of the polyamides are resistant to moisture, resistant to most solvents, and possess an unusually high degree of toughness and strength.

Since it is obvious that many changes and modifications can be made in the above-described details without departing from the nature and spirit of the invention, it is to be understood that the invention is not to be limited thereto except as set forth in the appended claims.

I claim:

1. A composition of matter comprising a solution of a synthetic linear polyamide in a mono nitro derivative of a monohydric aliphatic alcohol of 2 to 8 carbon atoms and wherein the nitro group occupies the alpha position, said linear polyamide comprising the reaction product of a linear polymer-forming composition which comprises in substantial amount reacting material selected from at least one of the groups consisting of (a) monoamino-monocarboxylic acids, and (b) mixtures of diamine with dibasic carboxylic acid.

2. A composition of matter comprising a solution of a synthetic linear polyamide in an alkyl derivative of a mono nitro derivative of a monohydric aliphatic alcohol of 2 to 8 carbon atoms and wherein the nitro group occupies the alpha position and wherein the alkyl group contains 2 to 5 carbon atoms and is substituted for a hydrogen atom on the same carbon atom carrying the nitro group, said linear polyamide comprising the reaction product of a linear polymer-forming composition which comprises in substantial amount reacting material selected from at least one of the groups consisting of (a) monoamino-monocarboxylic acids, and (b) mixtures of diamine with dibasic carboxylic acid.

3. A composition of matter comprising a solution of a synthetic linear polyamide in a solvent comprising 2-nitro 1-butanol, said linear polyamide comprising the reaction product of a linear polymer-forming composition which comprises in substantial amount reacting material selected from at least one of the groups consisting of (a) monoamino-monocarboxylic acids, and (b) mixtures of diamine with dibasic carboxylic acid.

4. A composition of matter comprising a solution of 1 part of polyhexamethylene adipamide having an intrinsic viscosity of 0.45 in 9 parts of 2-nitro 1-butanol, the parts being by weight.

5. A composition of matter comprising a solution of 1 part of an interpolymer prepared from hexamethylene adipamide and hexamethylene sebacamide in the weight ratio of 30:70 and having an intrinsic viscosity of 1.0 in 19 parts of 2-nitro 1-butanol, the parts being by weight.

6. A composition of matter comprising a solution of 5 parts of an interpolymer prepared from hexamethylene adipamide and hexamethylene sebacamide in the weight ratio of 60:40 and having an intrinsic viscosity of 0.8 in a solvent mixture consisting of 7½ parts of 2-nitro 1-butanol, 7½ parts of ethylene chlorhydrin and 5 parts of benzyl alcohol, the parts being by weight.

WILLIAM WAY WATKINS.